United States Patent [19]

Swart

[11] 4,294,341

[45] Oct. 13, 1981

[54] GEAR RATIO SELECTION APPARATUS

[76] Inventor: Petrus H. Swart, Bank Colliery, House No. 1A, Middelburg District, Transvaal, South Africa

[21] Appl. No.: 10,794

[22] Filed: Feb. 9, 1979

[30] Foreign Application Priority Data

Feb. 15, 1978 [ZA] South Africa ............... 78/0885
Jun. 13, 1978 [ZA] South Africa ............... 78/3385

[51] Int. Cl.³ ............................................. B60K 41/28
[52] U.S. Cl. ............................ 192/0.073; 192/0.076; 192/0.092; 192/103 R; 74/866
[58] Field of Search ............... 192/0.073, 0.052, 0.062, 192/0.075, 0.076, 0.092, 0.048, 103 R; 74/866

[56] References Cited

U.S. PATENT DOCUMENTS

| | | | |
|---|---|---|---|
| 2,554,314 | 5/1951 | Price | 192/0.073 |
| 2,604,197 | 7/1952 | Livermore | 192/0.073 |
| 3,904,007 | 9/1975 | Braun et al. | 192/0.076 |
| 3,937,105 | 2/1976 | Arai et al. | 74/866 |
| 4,038,889 | 8/1977 | Lindow et al. | 74/866 |
| 4,109,772 | 8/1978 | Poore | 192/0.073 |
| 4,131,035 | 12/1978 | Mizuno et al. | 74/866 |
| 4,155,277 | 5/1979 | Minami et al. | 74/866 |
| 4,177,747 | 10/1978 | Windsor | 74/866 |

FOREIGN PATENT DOCUMENTS 1505535 7/1970 Fed. Rep. of Germany .

Primary Examiner—George H. Krizmanich

[57] ABSTRACT

Apparatus for controlling the operation of a vehicle's gear box. The apparaus generates electrical signals which are proportional to the vehicle's speed, the speed of the vehicle's engine, and the position of the vehicle's throttle.

These signals are used to compute which gear is to be engaged at any particular instant, and where necessary, gear selection signals are generated. The gear selection signals are used to actuate the vehicle's clutch, and to control solenoids which manipulate the gear box.

14 Claims, 6 Drawing Figures

RATIO SELECTOR MODULE (68)

SELECTOR OPERATOR LOGIC MODULE (76)

FIG. 4 RATIO CHANGE MODULE (70)

GEAR RATIO SELECTION APPARATUS

BACKGROUND OF THE INVENTION

This invention relates to gear ratio selection apparatus for a vehicle.

The vast majority of today's road vehicles can be grouped into two sections. Firstly, there are those vehicles which have manually operated gear boxes and secondly, there are those vehicles in which the selection of gears is effected automatically by mechanical means. Although automatic gear boxes are very popular they do have drawbacks in that they are expensive and in that they are less efficient than their manual counterpart. With inflation and ever increasing fuel prices these aspects are becoming most important to the modern motorist.

SUMMARY OF THE INVENTION

It is an object of the present invention to provide apparatus for automatically selecting the gear ratios of a manual-type gear box.

The invention provides gear ratio selector apparatus for a vehicle which comprises:

means to generate a first signal which is dependent on the vehicle's speed, means to generate a second signal which is dependent on the vehicle's throttle position, means responsive to the first and second signals to generate gear ratio selection signals, and means responsive to the gear ratio selection signals to control the operation of the gear box of the vehicle.

Preferably, the gear box control means causes the vehicle's clutch to be disengaged and a gear determined by the relationship of the first and second signals to be engaged.

Further according to the invention the engine speed is controlled at least by the first signal during gear changes.

In one form of the invention the first signal is operative to control the setting of the vehicle's carburettor during gear changes.

In a different form of the invention the first signal is operative to interrupt the engine's ignition during gear changes.

Further according to the invention the gear box is responsive to the speed of the vehicle's engine and causes the vehicle's clutch, when disengaged, to be re-engaged when the engine speed rises above a predetermined value.

According to a different aspect of the invention there is provided gear ratio selector apparatus for a vehicle which comprises:

means to generate a first signal which is dependent on the vehicle's speed, means to generate a second signal which is dependent on the vehicle's throttle position, means to generate a third signal which is dependent on the vehicle's engine speed, means responsive to the first and second signals to generate a gear ratio selection signal for a gear determined by the relationship of the first and second signals, control means responsive to the first, second and third signals and the gear ratio selection signal to reduce the speed of the vehicle's engine and disengage the vehicle's clutch, and means responsive to the gear ratio selection signal to engage the determined gear, the control means then being responsive to the third signal and causing the vehicle's clutch to be re-engaged when the engine speed rises above a predetermined value.

Further according to the invention the gear ratio selection signal generating means includes a plurality of modules, each of which is associated with one of the gears, each module producing a gear ratio selection signal for its associated gear when a predetermined relationship of the first and second signals occurs, and producing a signal which inhibits the operation of at least some of the other modules to prevent their producing gear ratio selection signals at the same time.

Further according to the invention the apparatus includes control switching means for selecting the highest gear which may be engaged, the control switching means producing a signal, associated with the selected highest engageable gear, which is applied to at least one of the modules to inhibit the production of a gear ratio selection signal for a higher ratio gear.

Further according to the invention the control means includes means to generate a fourth signal which is proportional to the speed of the vehicle's clutch plate, and means to compare the third signal and the fourth signal and generate a fifth signal when the third and fourth signals are in a predetermined relationship to one another, the fifth signal controlling the re-engagement of the vehicle's clutch.

BRIEF DESCRIPTION OF THE DRAWINGS

The invention is further described by way of example with reference to the accompanying drawings in which.

DESCRIPTION OF PREFERRED EMBODIMENTS

Figure 1:
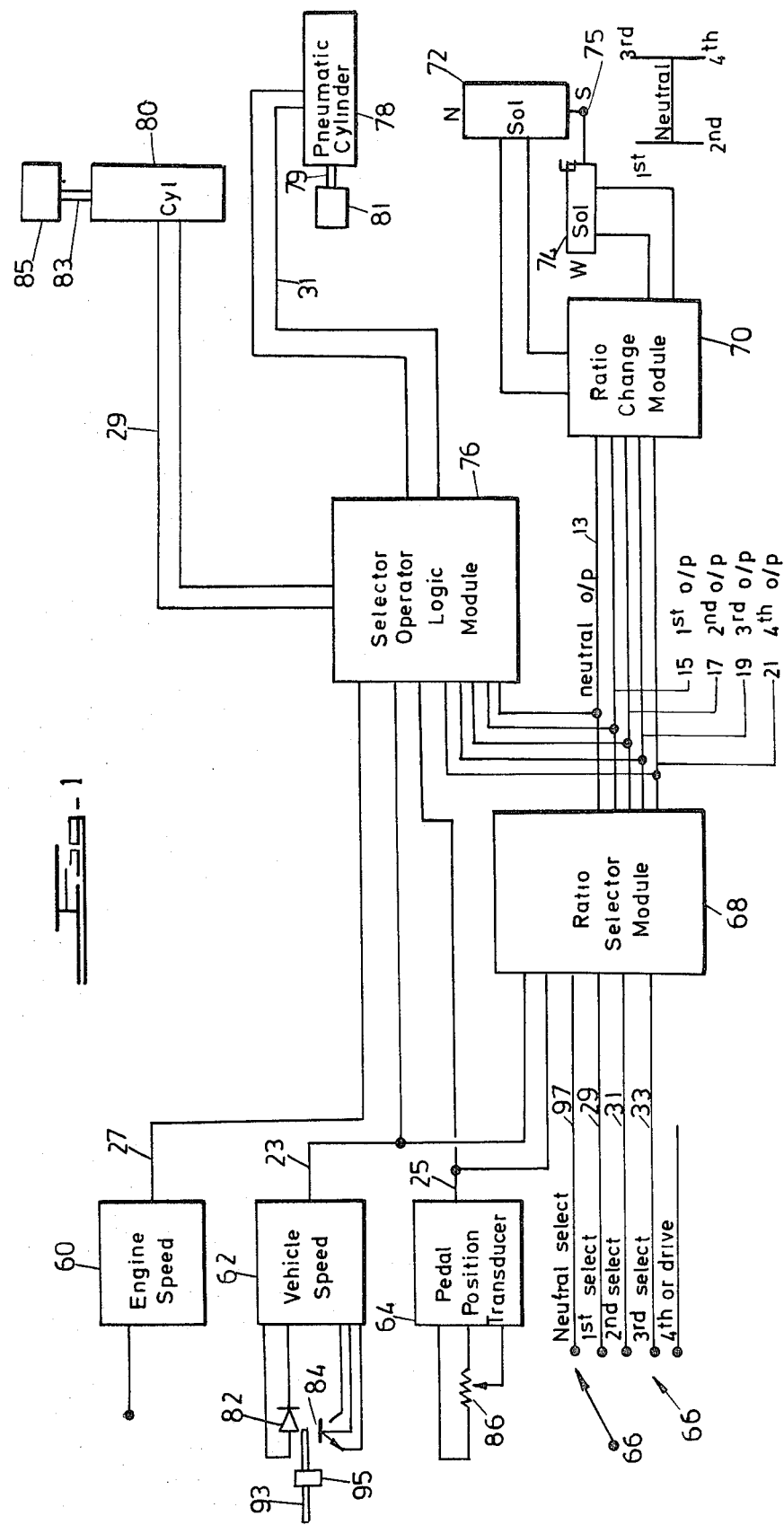
FIG. 1 is a block diagram of gear ratio selector apparatus according to the invention.

Referring to FIG. 1 the apparatus includes a manual shift gearbox 2 with a gear lever 75, a manually operable clutch pedal 4 and a switch 6 positioned between the vehicle's battery 8 and a power feed line 10 to the apparatus, so that the apparatus can be de-activated by opening the switch 6. The apparatus of the invention also includes a module 60 which generates a signal 27 which is proportional to the engine speed of the vehicle, a module 62 which generates a signal 23 which is proportional to the vehicle's speed, a module 64 which generates a signal 25 which is proportional to the position of the throttle or accelerator pedal of the vehicle, a five position switch 66 which is used for selecting the highest gear into which the gear box of the vehicle may be changed, a ratio selector module 68, a ratio change module 70, solenoids 72 and 74 which are controlled by the module 70, a selector operator logic module 76, and pneumatic cylinders 78 and 80 which are controlled by the module 76 and which themselves at least partly control the operation of the carburettor and the clutch of the vehicle respectively.

The module 60 is a relatively simple circuit which produces an analogue signal 27 which is directly proportional to the engine speed. The signal 27 may for example be produced by means of a monostable multivibrator which is triggered by the pulses which are applied to the distributor of the vehicle and which therefore generates a square wave output which is determined by the engine speed. This square wave output can be smoothed to provide a continuous analogue signal.

The module 62 includes a light emitting diode 82 and a photo transistor 84 which are arranged with a tooth wheel 93 between them. The wheel is attached to a component such as the speedometer drive cable 95 of the vehicle, which rotates at a rate which is proportional to the speed of the vehicle. The rotating wheel causes the light from the diode 82 to be applied to the transistor 84 as a series of pulses and these pulses are converted into an analogue voltage signal 23 which is proportional to the vehicle's speed. Alternatively, the signal 23 can be produced by means of a magnetic pick-up on a rotating member.

The module 64 includes a potentiometer 86 which is attached to the accelerator pedal of the vehicle in such a way that as the pedal is depressed the voltage at the tap-off point of the potentiometer increases, producing the signal 25.

The selector switch 66 is located at any convenient position inside the vehicle where it is accessible to the driver. The switch is movable to five positions, namely neutral select, first select, second select, third select and fourth select. At the first four of these positions signals 97, 29, 31 and 33 respectively are generated. In the fourth select position no signal is generated.

The solenoids 72 and 74 are double acting in the sense that they can be moved positively in each of two directions labelled north and south, and west and east, respectively. The plungers of the solenoids are connected to the normal gear lever 75 of the vehicle.

The cylinders 78 and 80 are operated by vacuum pressure obtained from the vehicle's manifold. By opening bleeder valves on the cylinders the rate at which they are operated when the vacuum pressure is applied can be varied. The cylinder 78 is used via a linkage 79 to open or close a carburettor 81, and the cylinder 80 via a linkage 83 controls a slave cylinder 85 of an hydraulic clutch, or the linkage or cable of a mechanical clutch, according to the nature of the vehicle.

Figure 2:
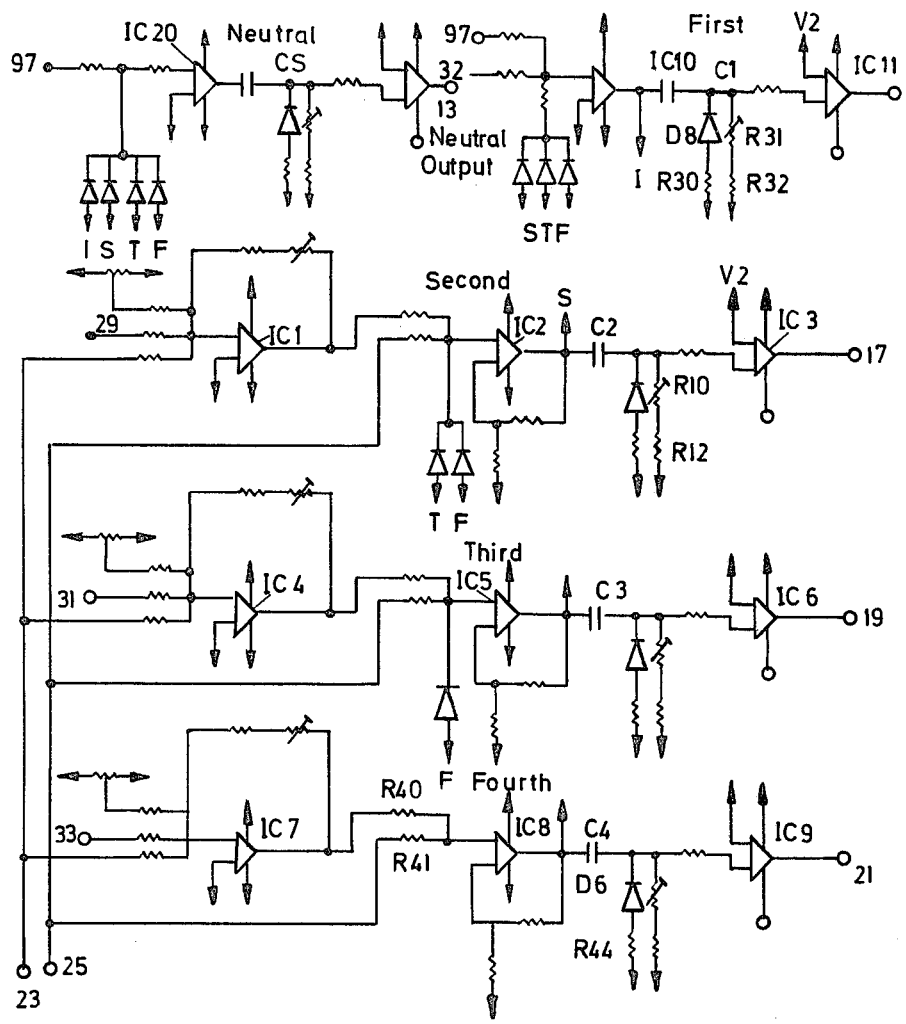
FIG. 2 is a circuit diagram of a ratio selector module of the apparatus.

The signals 97, 29, 31 and 33 generated by the switch 66 are applied to the module 68 at the point indicated in FIG. 2. This module includes sub modules designated neutral, first, second, third and fourth which generate signals 13, 15, 17, 19 and 21 referred to as neutral output, first output, second output, third output and fourth output respectively.

Figure 3:
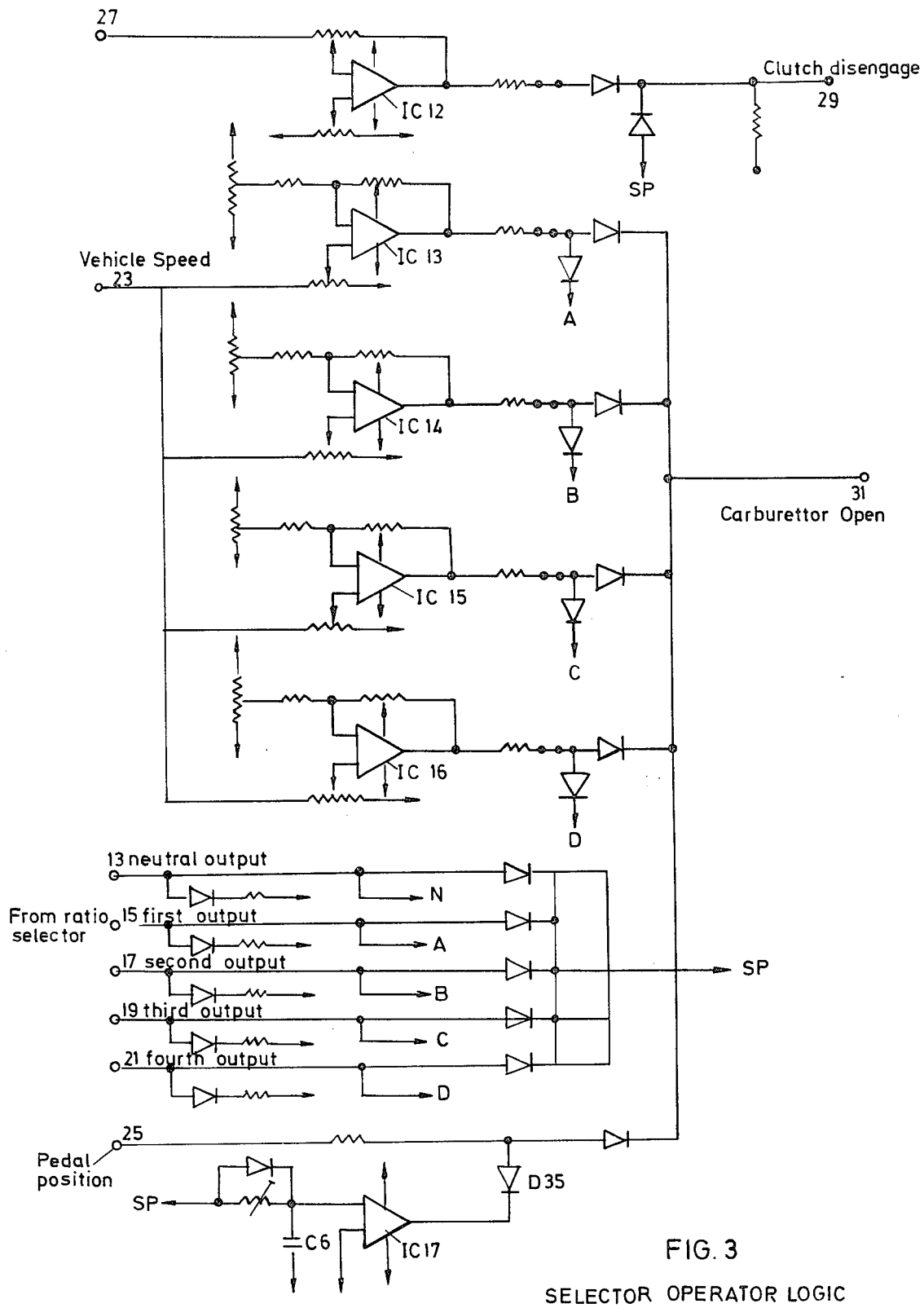
FIG. 3 is a circuit diagram of a selector operator logic module of the apparatus.
Figure 4:
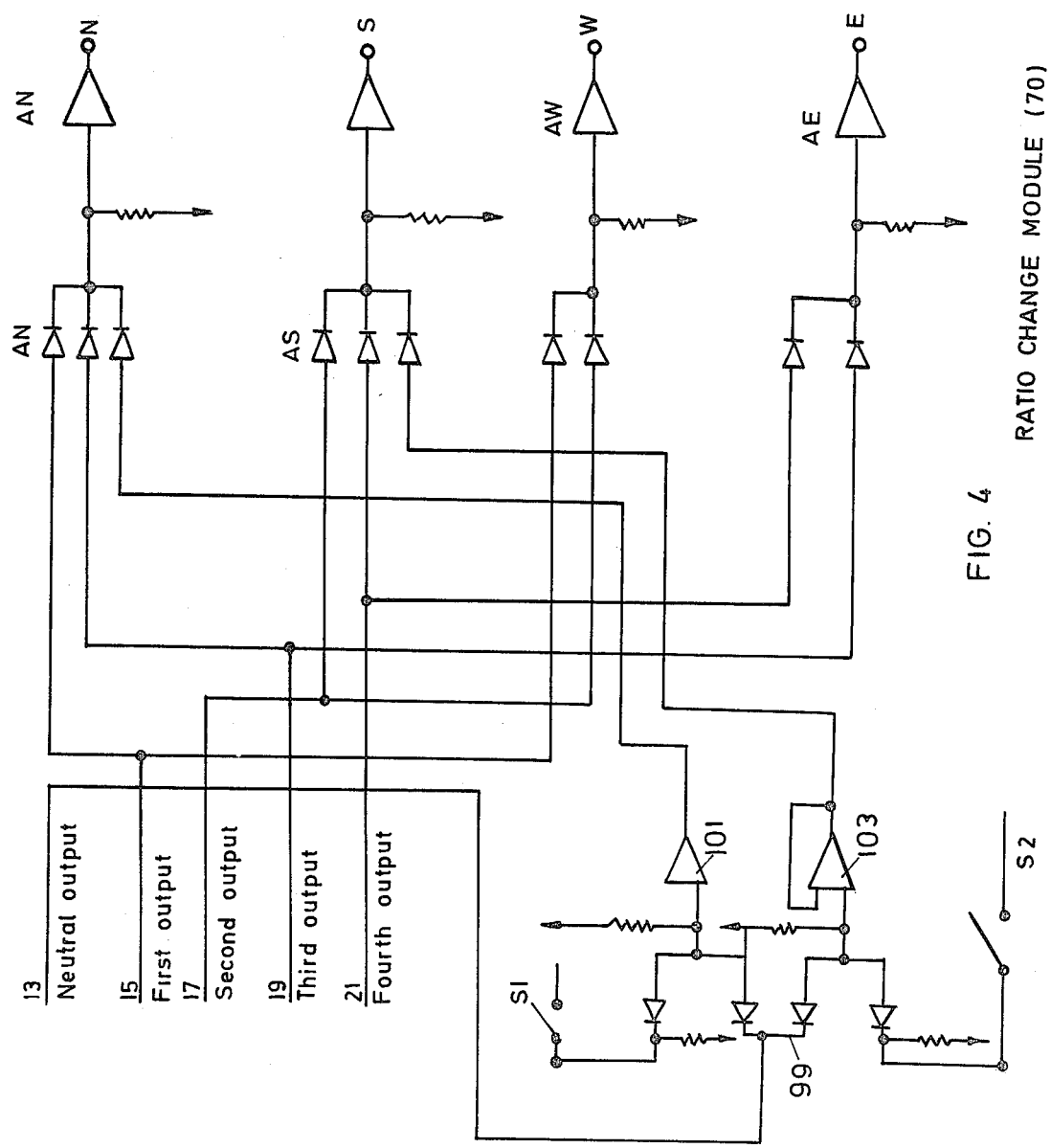
FIG. 4 is a circuit diagram of a ratio change module of the apparatus.

The output signals 13, 15, 17, 19 and 21 are applied to the logic module of FIG. 3 and to the ratio change module of FIG. 4. The logic module also has inputs connected to the vehicle speed signal 23, the pedal position signal 25 and the engine speed signal 27, and it generates signals 29 and 31 which control the operation of the cylinders 80 and 78 respectively.

The module of FIG. 4 can generate signals designated N, S, W and E for controlling the north, south, west and east movement respectively of the gear lever 75 by means of the solenoids 72 and 74.

Assume that the vehicle's engine is running, that the vehicle is at rest and that the driver of the vehicle has selected one of the four gear positions on the switch 66. A signal is continuously applied to an input terminal 32 of the first sub-module and the logic of the first sub-module of FIG. 2 is such that the first output signal 15 is generated. This signal is applied to the logic module of FIG. 3 causing the indicated terminal A to go to a high logic level and a high logic level signal S P to be generated. Since the engine is at idling speed the engine speed signal 27 is low and this analogue signal which is inverted through an amplifier I C 12 generates the clutch disengage signal 29. The signal 29 is applied to the cylinder 80 and the clutch is held in the disengaged position. At the same time the vehicle speed signal 23 which is applied in parallel to a number of amplifiers I C 13, I C 14, I C 15 and I C 16 through different resistive scaling networks, is used to drive the carburettor open signal 13 through the amplifier I C 13, the output signal of which is enabled by the high logic signal A. At this stage the vehicle is stationary and the vehicle speed signal 23 therefore has no effect on the carburettor setting. The high logic signal S P charges a capacitor C 6 and this causes a diode D 35 to conduct to an inverting amplifier I C 17. The pedal position signal 25 is therefore inhibited and it too has no effect on the carburettor open signal 31.

The first output signal 15 is produced by an amplifier I C 11 in the first sub-module in FIG. 2. The amplifier I C 11 goes on when a control amplifier I C 10 goes on. When this happens a capacitor C 1 which is charged discharges through resistors R 31 and R 32. The time constant of the resistors R 31 and R 32 and the capacitor C 1 is selected to hold the amplifier I C 11 on for a period of approximately 3 seconds. Consequently after the 3 second period the first output signal 15 drops to a low level whereupon the signals A and S P in FIG. 3 also drop to low levels. When A drops to a low level the vehicle speed signal 23 has no control through the amplifier I C 13 or any of the other amplifiers over the carburettor open signal 31. On the other hand since the signal S P is also low the diode D 35 no longer conducts and control of the carburettor open signal 31 is transferred to the pedal position signal 25.

The first output signal 15 generated by the module 68 is also applied to the ratio change module of FIG. 4. This signal is amplified by north and west amplifiers A N and A W to produce the signals N and W respectively and these signals are applied to the solenoids 72 and 74 causing the gear lever 75 to be moved to the north west position, that is to the position of first gear. The first gear is therefore selected.

At this stage the vehicle is stationary with its engine running and with first gear selected. However, the clutch is disengaged for the engine speed is at idling. When the accelerator pedal of the vehicle is depressed, and at a predetermined level, the engine speed signal 27 will rise sufficiently high to change the analogue level of the clutch disengaged signal 29 through the amplifier I C 12. The signal 29, through the cylinder 80, causes the clutch to be engaged at a proportional position, relative to the engine speed and the span and bias settings of I C 12. The vehicle then begins to move and the vehicle speed increases.

As the vehicle speed increases so does the vehicle speed signal 23. This signal is constantly being compared to the pedal position signal 25 by the various sub-modules of the ratio selector module of FIG. 2. Each of the sub-modules is designed to generate an output signal at a vehicle speed which is predetermined for the vehicle. When the correct relationship of vehicle speed to pedal position is obtained at which second gear is to be selected, an amplifier I C 2 in the second sub-module goes from the off to the on state and its output signal S goes high driving the amplifier I C 10 off through an OR-GATE. The capacitor C 1 which is charged discharges through a resistor R 30 and a diode D 8 and consequently there is no switching of the amplifier I C 11. However, a capacitor C 2 in the second sub-module discharges through resistors R 10 and R 12 and the output amplifier I C 3 of this sub-module goes on for approximately 3 seconds producing the second output signal 17. As before this signal is applied to the logic module of FIG. 3 and to the ratio change module of FIG. 4.

In the logic module of FIG. 3 the signal 17 causes signals B and S P to take up high logic levels. Since the signals A, C and D are at low logic levels the carburettor open signal 31 is controlled by the vehicle speed signal 23 through the amplifier I C 14. Consequently, the engine speed drops to a value which is precalculated as being the optimum for a smooth gear change at the particular vehicle speed. Once again the high logic signal S P inhibits the control of the carburettor open signal 31 by the pedal position signal 25 for a 3 second period while the capacitor C 2 in the second sub-module of FIG. 2 is discharging. After this capacitor has discharged control of the carburettor open signal 31 is transferred from the vehicle speed signal 23 to the pedal position signal 25. During this sequence of events the signal 17 which is applied to the ratio change module of FIG. 4 effects a gear change from first to second. Referring to FIG. 4 the signal 17 is applied to amplifiers A S and A W which produce signals S and W respectively which energise the solenoids 72 and 74 and cause the gear lever to be moved to the south west position, that is to the position of second gear.

The gear change sequence described is repeated for each of the gears according to the relationship of vehicle speed to accelerator pedal position. The highest gear to which the gear box is changed is selected by the setting of the switch 66. For example if the switch is turned to the position of third select then a signal 33 is applied to an amplifier I C 7 of the fourth sub-module of FIG. 2 and the switching of this amplifier and of amplifiers I C 8 and I C 9 in the sub-module are inhibited. Consequently even if the vehicle speed and the pedal position signals 23 and 25 are in the correct relationship to one another the fourth output signal 21 is never produced. The first, second, third and fourth sub-modules each produce signals I, S, T and F at the output of the amplifiers I C 10, I C 2, I C 5 and I C 8 respectively, and these outputs signals are applied through OR-GATES in the preceding sub-modules to inhibit their actuation.

The changing down of the gears is effected in a similar manner to the changing up of the gears. For example assume that the vehicle is in fourth gear and that the relationship of the vehicle speed signal 23 to the pedal position signal 25 is such as to indicate that a change down from fourth gear to third gear is required. Referring to the fourth sub-module the summing network consisting of resistors R 40 and R 41 connected to an input terminal of the amplifier I C 8 switches the amplifier off and its output goes low. The signal F which is low is applied to the input of the amplifier I C 5 of the third sub-module together with the vehicle speed and pedal position signals 23 and 25 respectively and the conditions are such that the amplifier I C 5 is turned on.

Its output signal T goes high inhibiting operation of the amplifiers I C 10 and I C 2 in the first and second sub-modules and of the amplifier I C 20 in the neutral sub-module. The third output signal 19 is generated in the third sub-module in a manner analogous to that already described and the gear lever is moved to the north east position.

The invention thus provides apparatus which may be fitted as original equipment on a vehicle or as a modification to a vehicle with a manual type gear box and which completely simulates the operation of conventional automatic gear boxes. With each gear change it is natural that the vehicle speed falls off slightly. Thus in order to avoid the possibility that the apparatus, when the vehicle is changed into a higher gear, is presented with a set of conditions indicating that the gear box is to be changed back into the lower gear, it is necessary to build into each of the sub-modules a hysteresis effect. This is catered for by the resistors connected to the input terminals of the various amplifiers in the sub-modules. The apparatus has the advantage that all the benefits of a manual type gear box are retained yet fully automatic operation of the gear box is achieved. In addition the points at which the gear changes are effected may easily be adjusted to suit the driver's requirements or road conditions.

For example the value of the resistors through which the vehicle speed 23 is applied to the various amplifiers of the sub-modules may be varied within the preset limits to determine the gear change points. Alternatively, the vehicle speed signal 23 and the pedal position signal 25 could be scaled or tapped by means of a potentiometer to alter the gear change points.

If the switch 66 is turned to the neutral select position the signal 97 is generated and applied to the neutral sub-module of FIG. 2, and once the correct conditions are reached, ie when the signals I, S, T and F applied to the input OR-GATE fall to the low logic levels, the neutral output signal 13 is generated. This signal is applied to an OR-GATE 99 in the ratio change module of FIG. 4.

Assume that the vehicle is in fourth gear when neutral is selected. In this gear, as well as in second gear, a switch S1, attached to the gear lever, is closed. Similarly, in first and third gear a switch S 2 also attached to the gear lever is closed. Thus if neutral is selected the output of a buffer operational amplifier 101 goes high and the signal N is generated causing the gear lever to be moved toward the position of third gear. Once the lever reaches a position between fourth and third gear, the switch S 1 opens. The signal N then falls to a low level and movement of the gear lever stops. The lever therefore moves into the neutral position.

A similar process takes place if the gear lever is in first or third gear. In this case the switch S 2 is closed and an amplifier 103 causes the S signal to be generated. This signal ceases once the gear lever is moved to the neutral position as the switch S 2 then opens.

The following aspects should be noted in respect of the apparatus of the invention:

1. When the apparatus fails or is switched off, operation of the car reverts automatically to the conventional, manual mode, 2. The reverse gear can be selected automatically in a way which is similar to the manner in which the forward gears are selected.

3. The apparatus can easily be combined with an automatic speed control system for the signals which are necessary for the speed control system are already available.

4. The apparatus will only select a lower gear ratio when the conditions of speed and acceleration are compatible, even if the selector switch is set to a lower ratio with the vehicle at a high speed.

5. The signals 23, 25 and 27 can be monitored and the operation of the apparatus can be inhibited if any of the signals becomes abnormal.

6. The linkage 79 between the accelerator pedal and the carburettor can be fitted with a mechanical override which enables normal manual driving in the event of a total failure of the apparatus.

7. Mechanical servo power for the cylinders 78 and 80 may be derived from vacuum, pneumatic, hydraulic or electrical sources, generated in the vehicle.

In the example of the invention thus far described the synchronisation of engine speed to clutch plate speed during a gear change is effected by means of carburettor manipulation. This involves the use of a servo-mechanism.

Figure 5:
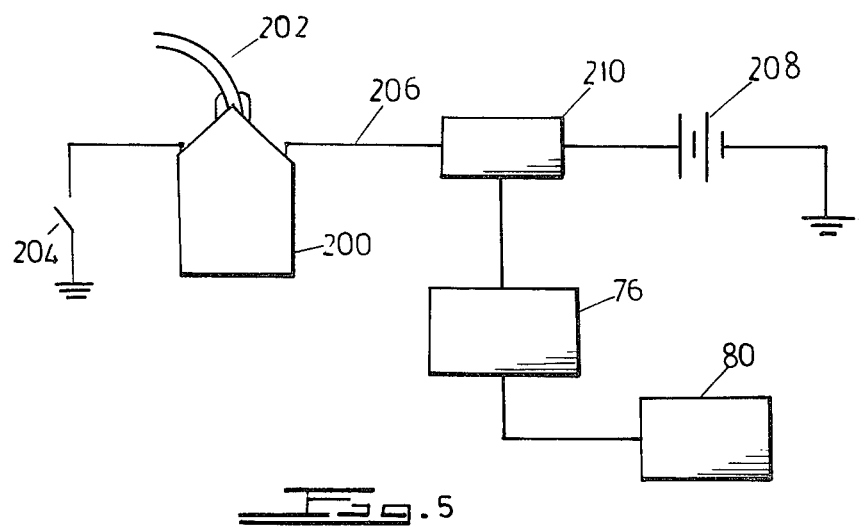
FIG. 5 is a block diagram of apparatus used to interrupt the ignition system of a vehicle.
Figure 6:
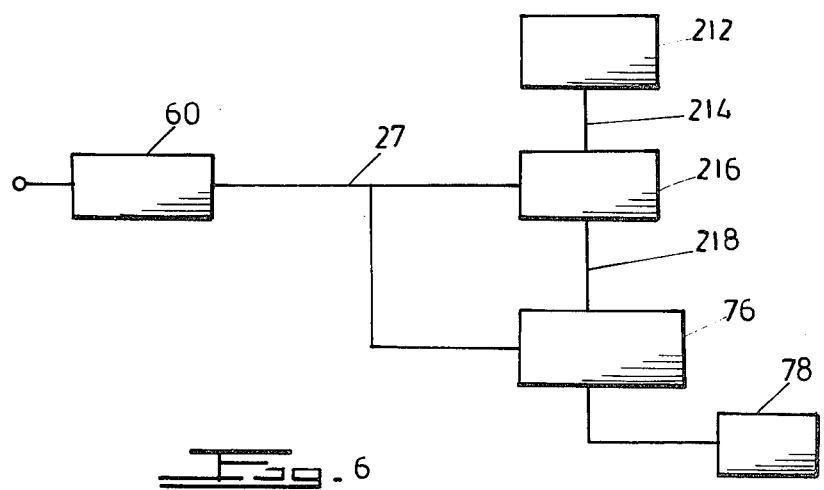
FIG. 6 is a block diagram of a modified form of the invention.

FIGS. 5 and 6 illustrate aspects of the invention in which the synchronisation of engine speed to clutch plate speed is effected in different ways.

FIG. 5 illustrates an ignition coil 200 which has a high tension lead 202 and which is connected to a distributor with contacts 204. The ignition coil is connected by means of a low tension lead 206 to a battery 208. An electronic switch 210 is connected to the selector operator module 76.

In the earlier example the module 76 is connected to the pneumatic cylinder 78 which is used to manipulate the position of the engine's throttle so that the engine speed can be synchronised to the clutch plate speed during a gear change.

The apparatus of FIG. 5 allows the throttle servo-mechanism to be dispensed with. The electronic switch 210 is controlled by the selector operator logic module 76 in a manner which is analogous to the way in which this module controls the pneumatic cylinder 78. However, in this case the module 76 generates a signal which energises the electronic switch 210 thereby causing the low tension supply to the coil 200 to be interrupted. The engine speed then immediately drops and when it reaches a predetermined value at which the clutch is to be engaged the module 76 causes the pneumatic cylinder 80 to be operated in the manner previously described.

The gear change control apparatus of FIG. 6 provides yet another method of synchronising engine speed to clutch plate speed during a gear change. Use is made of the engine speed module 60 which generates the signal 27 which is proportional to the engine speed of the vehicle, and a transducer 212 which generates a signal 214 which is proportional to the speed of the clutch plate. The signals 27 and 214 are compared in a differential speed comparator 216 which produces an output signal 218 when the engine and clutch plate speeds are within a predetermined percentage of one another. For example the signal 218 is generated if the clutch plate speed is within 10% of the engine speed. The transducer 212 may consist of a magnet fixed to the clutch plate and a pick-up coil exposed to the rotating magnet. The output of the coil may be amplified.

The signal 27 is as before fed to the selector operator logic module 76 and the signal 218 is also fed to this module. The signal 218 is used to control the actuation of the pneumatic cylinder 78.

The arrangement of FIG. 6 can be used together with that of FIG. 5 and the signal 218 instead of controlling the actuation of the cylinder 78 can be used to control the actuation of the electronic switch 210.

The pedal position transducer 64 shown in FIG. 1 includes a potentiometer 86 which is attached to the accelerator pedal of the vehicle in such a way that as the pedal is depressed the voltage at the tap-off point of the potentiometer increases, producing a signal 25 which is dependent on the vehicle's throttle position.

It has been found that the relationship between engine power or torque and the vacuum pressure in an engine's manifold is more linear than the relationship between engine power and the butterfly valve position of a carburettor. Thus the module 64 can be replaced by a transducer which is sensitive to vacuum pressure. The output signal of this transducer is fed to the selector operator logic module 76 and to the ratio selector module 68 in exactly the same way as the signal 25 is. This has the advantage that the control signal is less subject to undesired operational changes brought about by mechanical linkage limitations. In addition the control achieved at the lower throttle openings is smoother and more accurate.

The ratio selector module 68, the selector operator logic module 76 and the ratio change module 70 all achieve their logic functions through the use of hardware. In each case the hardware is designed to function algorithmically, that is to produce predetermined output signals upon the occurrence of given input conditions. Thus these devices can be replaced by software controlled devices such as microprocessors.

A suitably programmed microprocessor comprising a central processing unit, read only memories and random access memories would perform the basic logical and analogue operations performed by the hardware described in the earlier specification. Microprocessor operation requires the use of peripheral devices such as analogue to digital converters.

The microprocessor programme may be stored on an erasable programme read only memory, or be provided on a face mask programmed read only memory device manufactured to meet specific requirements.

The use of a microprocessor would provide a system which is inherently more reliable and adaptable than the hardware configurations illustrated in FIGS. 1 to 6.

I claim:

1. Gear ratio selector apparatus for use on a vehicle which has a manual shift gearbox with a gear changing mechanism and a manually operable clutch, the apparatus comprising: means for generating a first signal which is dependent on the vehicle speed, means for generating a second signal which is dependent on the vehicle's throttle position, means responsive to the first and second signals for generating gear ratio selection signals, means responsive to the gear ratio selection signals for disengaging the vehicle's clutch and acting directly on said gear changing mechanism to select a desired gear, means for deactivating the apparatus so that the manual shift gearbox can be operated manually, and means responsive to at least the first signal for controlling the engine speed during gear changes.

2. Apparatus according to claim 1 in which the engine speed is controlled at least by the first signal during gear changes.

3. Apparatus according to claim 2 in which the first signal is operative to control the setting of the vehicle's carburettor during gear changes.

4. Apparatus according to claim 2 in which the first signal is operative to interrupt the engine's ignition during gear changes.

5. Apparatus according to claim 1 in which the engine speed is controlled at least by the second signal after gear changes.

6. Apparatus according to claim 5 in which the second signal is operative to control the setting of the vehicle's carburettor after gear changes.

7. Apparatus according to claim 1 in which the gear box is responsive to the speed of the vehicle's engine and causes the vehicle's clutch, when disengaged, to be re-engaged when the engine speed rises above a predetermined value.

8. Apparatus according to claim 1 in which said gearbox includes a gear change lever and in which said means responsive to the gear ratio selection signals includes solenoids which act directly on the gear change lever to select the desired gear.

9. Gear ratio selector apparatus for use on a vehicle which has a manual shift gearbox and a manually operable clutch, the apparatus comprising: means for generating a first signal which is dependent on the vehicle's speed, means for generating a second signal which is dependent on the vehicle's throttle position, means for generating a third signal which is dependent on the vehicle's engine speed, means responsive to the first and second signals for generating a gear ratio selection signal for a gear determined by the relationship of the first and second signals, control means responsive to the first, second and third signals and the gear ratio selection signal for reducing the speed of the vehicle's engine and for disengaging the vehicle's clutch, means responsive to the gear ratio selection signal for engaging the determined gear, the control means then being responsive to the third signal and causing the vehicle's clutch to be re-engaged when the engine speed rises above a predetermined value, and means for deactivating the apparatus so that the manual shift gearbox and the clutch can be operated manually.

10. Apparatus according to claim 9 in which the gear ratio selection signal generating means includes a plurality of modules each of which is associated with one of the gears, each module producing a gear ratio selection signal for its associated gear when a predetermined relationship of the first and second signals occurs, and at least some of the modules producing a signal which inhibits the operation of at least some of the other modules to prevent their producing gear ratio selection signals at the same time.

11. Apparatus according to claim 10 which includes control switching means for selecting the highest gear which may be engaged, the control switching means producing a signal, associated with the selected highest engageable gear, which is applied to at least one of the modules to inhibit the production of a gear ratio selection signal for a higher ratio gear.

12. Apparatus according to claim 9 in which the control means includes means to alter the setting of the vehicle's carburettor to reduce the speed of the engine.

13. Apparatus according to claim 9 in which the control means includes means to interrupt the vehicle's ignition to reduce the speed of the engine.

14. Apparatus according to claim 9 in which the control means includes means to generate a fourth signal which is proportional to the speed of the vehicle's clutch plate and means to compare the third signal and the fourth signal and generate a fifth signal when the third and fourth signals are in a predetermined relationship to one another, the fifth signal controlling the re-engagement of the vehicle's clutch.

* * * * *